Nov. 18, 1969   M. G. KRUTEIN   3,479,089
UNDERSEA STOCKPILE AND BLENDING APPARATUS
Original Filed June 7, 1965   4 Sheets-Sheet 1

INVENTOR.
MANFRED G. KRUTEIN
BY
Townsend and Townsend
ATTORNEYS

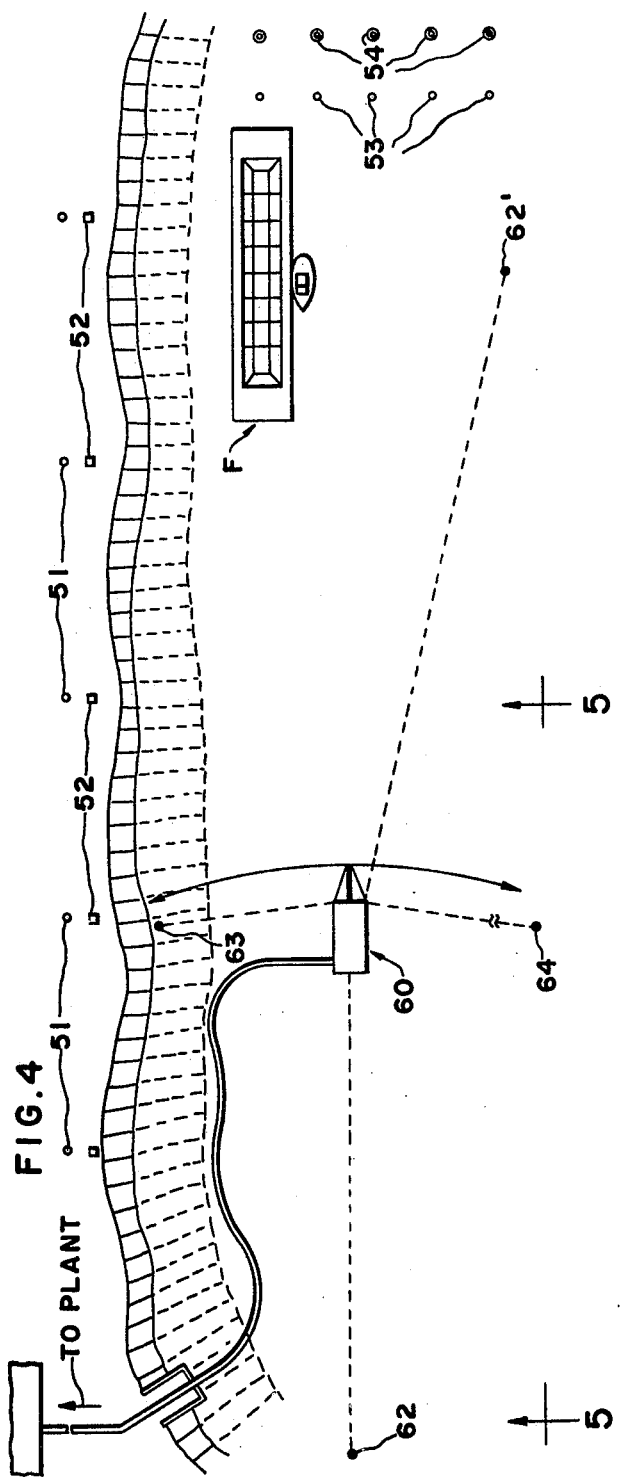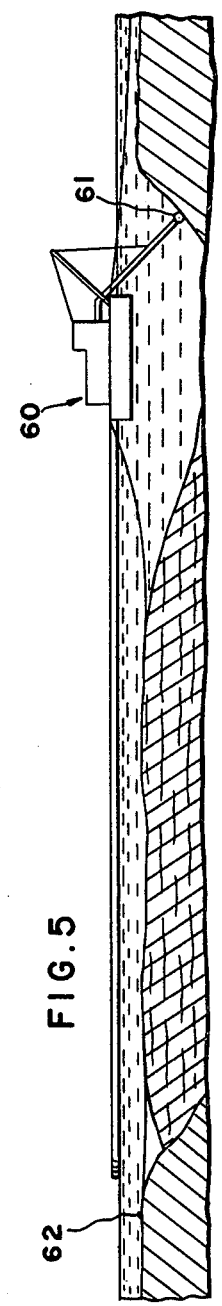

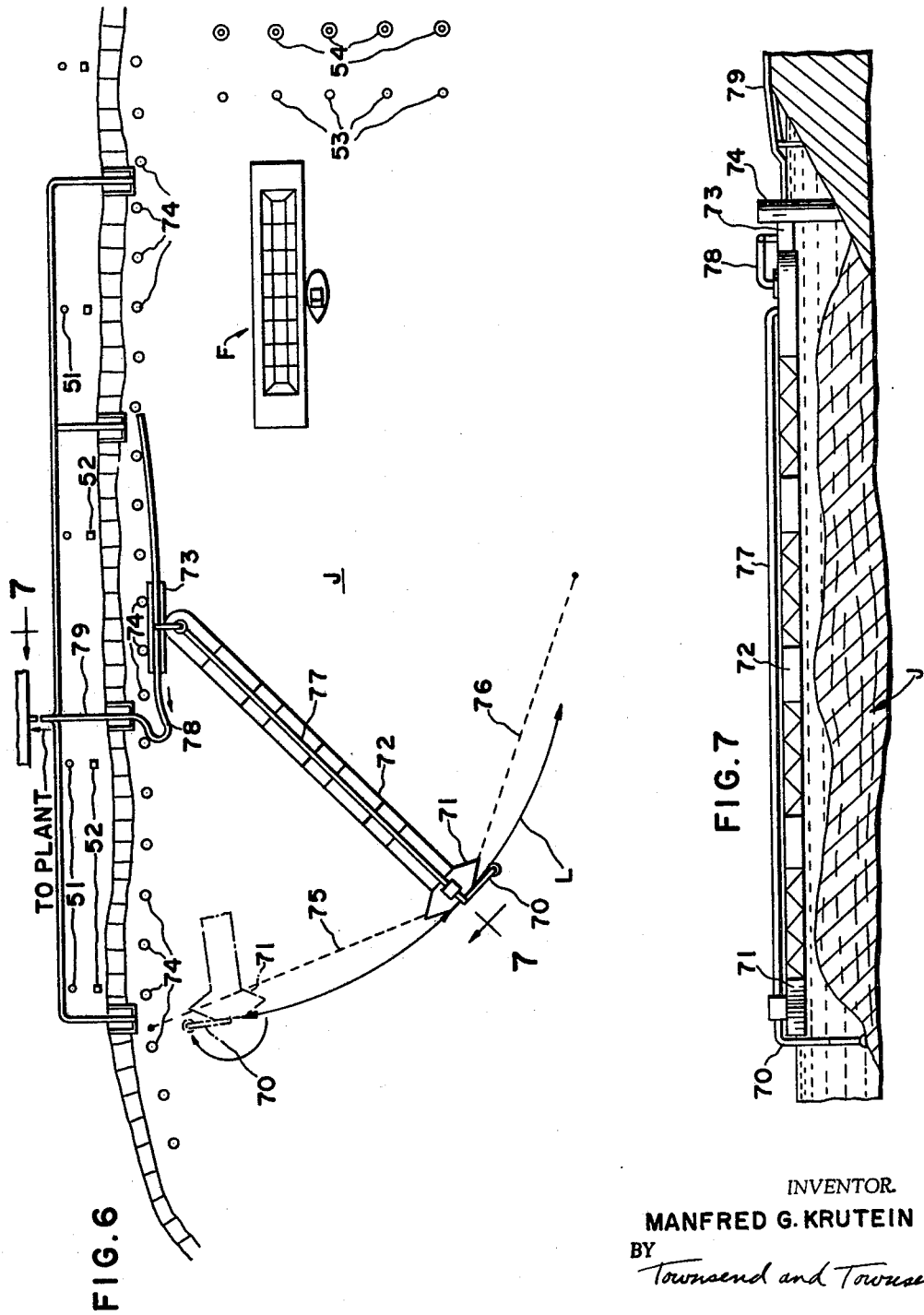

Nov. 18, 1969   M. G. KRUTEIN   3,479,089
UNDERSEA STOCKPILE AND BLENDING APPARATUS
Original Filed June 7, 1965   4 Sheets-Sheet 4
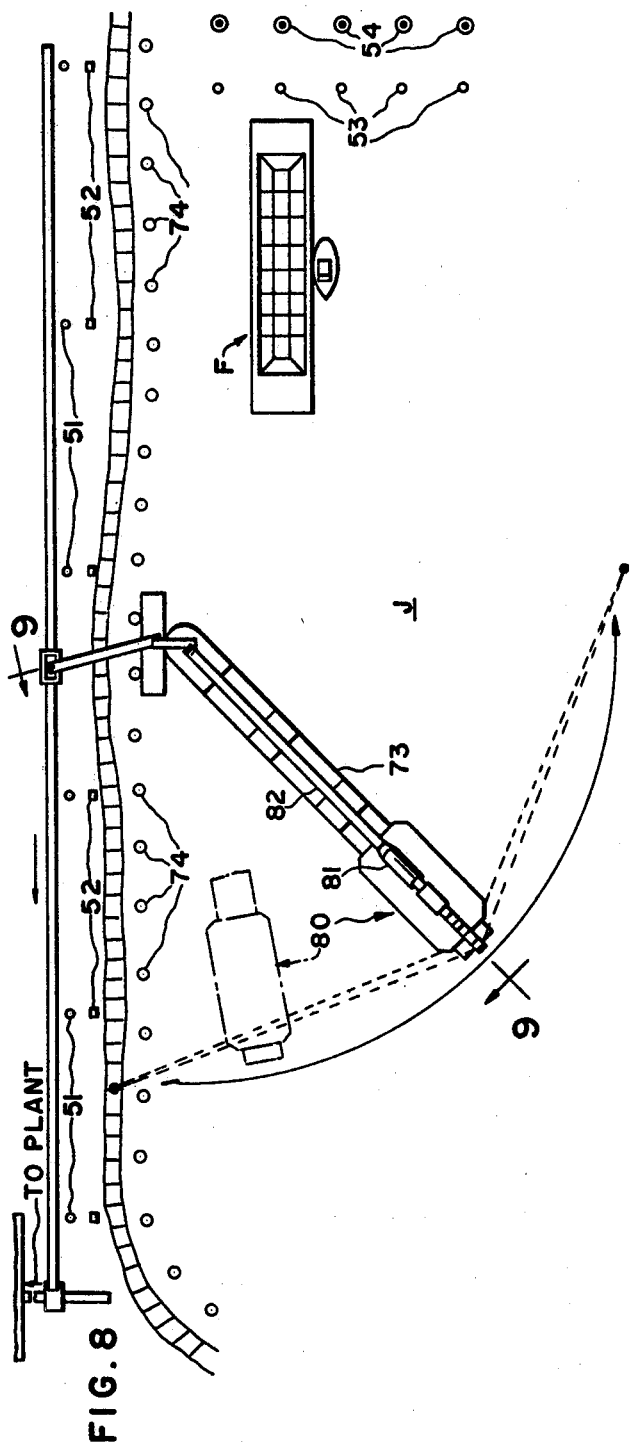
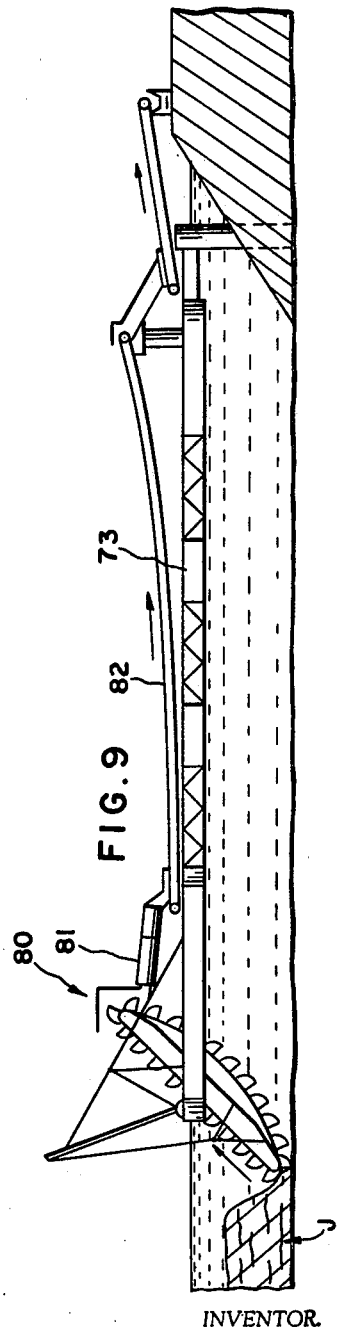
INVENTOR.
MANFRED G. KRUTEIN
BY Townsend and Townsend
ATTORNEYS : 3,479,089
Patented Nov. 18, 1969

3,479,089
UNDERSEA STOCKPILE AND BLENDING APPARATUS
Manfred G. Krutein, San Diego, Calif.
Original application June 7, 1965, Ser. No. 461,785. Divided and this application Apr. 22, 1968, Ser. No. 723,187
Int. Cl. E02f 7/00, 3/88; B65g 57/00
U.S. Cl. 299—9     8 Claims

ABSTRACT OF THE DISCLOSURE

Apparatus is disclosed for reclaiming and blending material in an underwater mineral stockpile including a patterned area, a dredging means and means for moving the dredging means across the patterned area for reclaiming minerals from underwater stockpile. The means for transporting the dredging means can be a plurality of dolphins at the side of the stockpile, a platform adapted for floatable attachment to a pair of dolphins with a floatable pontoon attached thereto and supporting the dredging means.

---

This application is a division of application for "Sea Mining Method," Ser. No. 461,785, filed June 7, 1965.

This application is directed to apparatus for recovering minerals stockpiled underneath the surface of the sea.

Until the present time stockpiling and blending of raw materials has been a very expensive operation. Typical methods and apparatus for stockpiling and blending raw materials are illustrated and described in U.S. Patent No. 3,069,027 to Dischinger wherein raw materials are stacked in large stockpiles on large land areas and reclaimed by a mechanism cutting through the stockpile. This method consumes a large land area that is very often quite expensive especially if the land area is located at or immediately adjacent to a navigable harbor.

Where raw materials being stockpiled have been dredged from the ocean floor and deposited on barges or otherwise carried to a processing plant in barges, the transportation and mining operations are influenced to a great extent by the weather, and it becomes very important to accomplish as much of the mining and transporting operation during fair weather as possible so as to convey the maximum amount of material to the processing plant where it can be stockpiled and used over an extended period of time. In this manner the processing plant can operate continuously while the mining and transporting operation operates intermittently or reasonably.

In order best to accomplish transportation of raw materials over water for stockpiling at a remote location during available time, a minimum amount of time should be spent in the docking and unloading of raw materials at the destination. With past methods and apparatus for stockpiling on land a great deal of time has been consumed and costly equipment required for docking and unloading the transportation vessels. Furthermore, this type of operation requires expensive docking facilities, and considerable damage can be caused both to the transportation vessel and the docking facilities during docking of the vessel.

In accordance with the invention of the parent application, Ser. No. 461,785, a number of loads of minerals are transported over the surface of the sea and each dumped in shallow water in a predetermined position of a pattern on the sea surface with the various loads evenly distributed over the pattern and a plurality of loads at substantially every position so that an underwater stockpile with a pattern of adjacent and superimposed mineral load layers is produced on the sea bottom. The minerals in a number of different loads are simultaneously reclaimed and blended as desired from the underwater stockpile by cutting across and through load layers with dredging equipment.

By stockpiling raw materials underwater as provided in accordance with the present invention, docking time for the barge is completely avoided so maximum advantage can be taken of good weather conditions for effectuating the mining and transporting operations over the sea. Additionally, the likelihood of damage to the barge and berth as is often caused during docking operations is avoided. Furthermore, the cost of the off-shore area on which underwater stockpiles are established is far less than that for conventional stockpiles positioned on dry land, and the cost of unloading the mineral stacking equipment is avoided.

In accordance with the present invention, one method and apparatus for reclaiming minerals from underwater stockpiles is a dredging vessel provided with fore and aft anchor assemblies for locating anchors at two opposing sides of the underwater stockpile and port and starboard anchor assemblies for locating anchors at the two other sides of the underwater stockpile. Means are provided for moving the dredge vessel between the fore and aft anchor assemblies and the port and starboard anchor assemblies to cause the dredging apparatus on the dredging vessel to sweep arcs across the underwater stockpile for picking up or reclaiming minerals in a plurality of loads thereby effectively to blend the material as it is reclaimed.

In accordance with another aspect of the present invention, another method and apparatus for reclaiming minerals from the underwater stockpile is the provision of a dredging apparatus at one end of a pontoon arm and means for rotating the pontoon arm about the opposite end to direct the dredging apparatus in arcs across the underwater stockpile. In one embodiment of this aspect of the present invention, the end of the pontoon arm that is caused to rotate about a rotating member is rotatably held against a barge which can be located between a pair of dolphins in a string of dolphins along one side of the underwater stockpile. The dredged material is conveyed from the dredging apparatus along the pontoon arm to the barge and thence to an adjacent land mass for conveyance to the processing plant. This assembly requires only the location of a plurality of dolphins along the side of the stockpile and the mooring of the barge to only two of the dolphins at any one time. With this apparatus the reclaimed minerals picked up by the dredging apparatus can be passed through a separation stage either at the dredge end of the pontoon arm or at any position along the length of the pontoon arms so that by the time the minerals reach land they are separated and dewatered for use as desired.

Other objects and advantages of this invention will become apparent when reading the following description and referring to the accompanying drawings in which similar characters of reference represent corresponding parts in each of the several views.

In the drawings:

FIG. 4 is a plan view schematically illustrating one method and apparatus of reclaiming stockpiled material in accordance with the present invention;

FIG. 5 is an elevational view of the structure illustrated in FIG. 4 taken along line 5—5 and schematically illustrating operation of the apparatus illustrated in FIG. 4;

FIGS. 6 and 8 are plan views similar to FIG. 4 but illustrating alternative apparatus to that illustrated in FIG. 4; and FIGS. 7 and 9 are views similar to FIG. 5 but illustrating respectively the structures shown in FIGS. 6 and 8.

In accordance with the present invention, minerals recovered from the ocean bottom or transported from another location for processing are stockpiled and blended utilizing the apparatus in accordance with the present invention and as illustrated in FIGS. 1–9.

Figure 1:
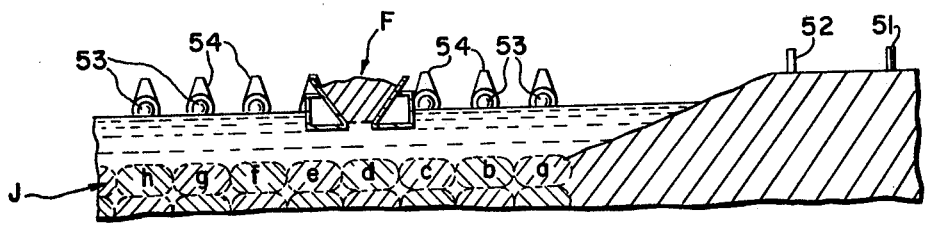
FIG. 1 is a schematic elevational view of the underwater stockpiling method and apparatus in accordance with the present invention.
Figure 2:
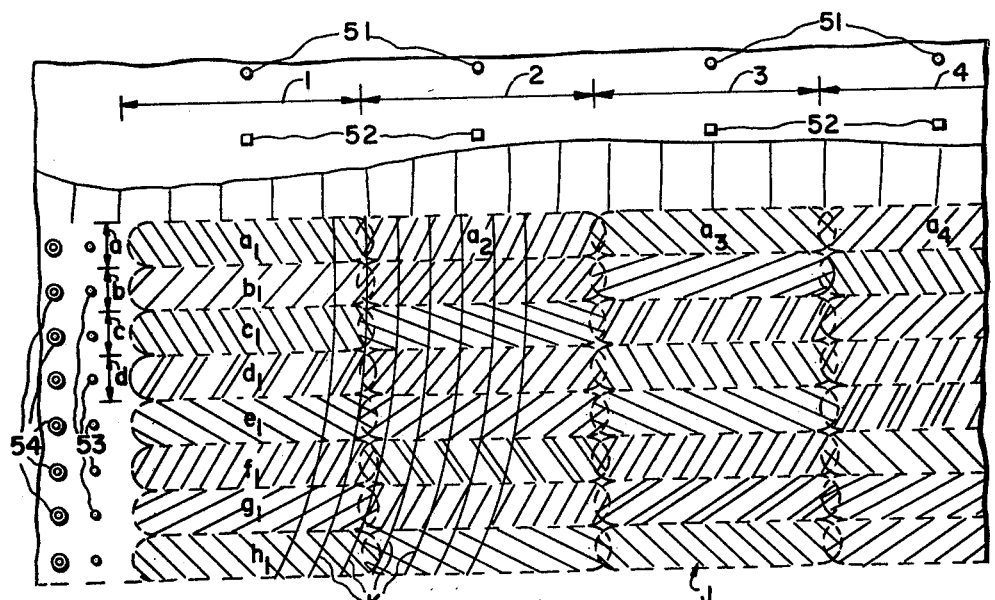
FIG. 2 is a plan view schematically illustrating the barge load configuration in the underwater stockpiling method in accordance with the present invention.

Referring now to FIG. 1 there is illustrated the manner in which mined minerals transported from an ocean mining operation or from another location for stockpiling at the processing plant are dumped from the bottom unloading barge F into a stockpile J below the surface of the sea in shallow water. A matrix or pattern of rows and columns is provided on the sea surface such as, for example, by means of sets of alignment guide members located along two mutually prependicular axes for properly designating a particular region of the pattern at which each barge load of minerals is to be dumped. As illustrated in FIGS. 1 and 2, the pattern can consist of regions located along the length of shoreline via location posts 51 and 52 provided in pairs which when vertically aligned from the tugboat guiding the loaded barge F designate general positions noted as 1, 2, 3. . . . Similarly, pair of buoys designated 53 and 54 spaced at equal intervals outwardly from the shore and spaced apart generally by the width of the load can be used to designate regions located at successively greater distances from the shoreline.

A plurality of mineral loads are dumped from the barges on the sea surface in shallow water evenly distributed over the matrix or pattern with a plurality of loads dumped at each position of the matrix to produce a stockpile J of adjacent and superimposed mineral loads.

Figure 3:
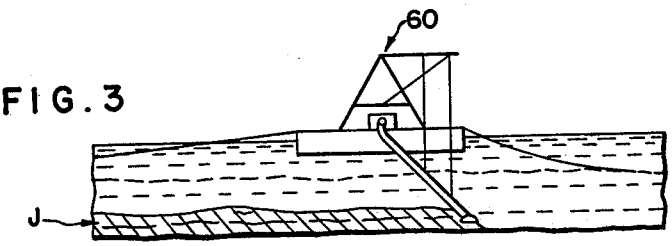
FIG. 3 is an elevational view schematically illustrating the reclaiming blending method and apparatus in accordance with the present invention.

The mineral loads can be deposited by a bottom unloading barge navigated by a tug without the necessity for docking the barge and utilizing expensive unloading equipment and extended docking time. When the mineral loads have been deposited in adjacent and superimposed load layers, a stockpile is formed. Then by reclaiming the minerals in a pattern cutting across and through load layers, the minerals of a number of different loads are effectively blended as the minerals are reclaimed for utilization at a nearby processing plant. FIG. 3 illustrates a suction dredge barge 60 cutting through the stockpile in sweeping arcs indicated by curved lines K in FIG. 2 for effectively traversing the width of the loads while at the same time cutting down through the loads to effectively blend the material being reclaimed. FIGS. 4–9 illustrate various methods and apparatus for reclaiming the stockpiled material.

As illustrated in FIGS. 4 and 5, a suction dredge indicated as 60 and provided with a cutter head 61 is swung in arcs centered at the main anchor 62 by winches which move the dredge back and forth between auxiliary anchors 63 and 64 spaced on the sides of the stockpile. The dredge 60 is moved in short length steps from one end of the stockpile at which is located one main anchor 62 to the other end of the stockpile at which is located another main anchor 62' so that the arcs K permit the entire stockpile to be reclaimed while simultaneously blended. The reclaimed material from the stockpiled is pumped through a floating pipeline to shore from whence it can flow through a stationary line to the feed point of the processing plant. If desired, dewatering equipment can be arranged along the stationary pipeline and the conveyance of the minerals converted from a pipeline conveyance to a belt conveyor. The conveying apparatus naturally depends upon the properties and sizes of the particles in the stockpile.

Referring now to FIGS. 6 and 7, there is shown a suction pipe 70 without cutter head mounted on a simple pontoon 71. The pontoon 71 is located at the end of a pontoon arm 72 which is swingably rotated about a pivot point on a support barge 73 which is moored against two dolphins of a series of dolphins 74 spaced along the shoreline alongside the stockpile J. The pontoon 71 is moved in arcs L by the action of winches and swing lines 75 and 76 to blend the minerals in the stockpile while reclaiming the minerals for use in a processing plant. The reclaimed minerals are pumped through a pipeline 77 along the pontoon arm 72 and via a short section of floating pipeline 78 to stationary pipelines 79 located at periodic points along the shoreline and thence to the processing plant.

FIGS. 8 and 9 illustrate a reclaiming apparatus similar to that shown in FIGS. 6 and 7 but wherein the reclaiming apparatus on the end of the pontoon arm includes a bucket dredge 80 for reclaiming the minerals from the stockpile J and depositing them on a dredge mounted trommel 81 in which coarse materials can easily be dewatered and dropped onto a belt conveyor 82 for transportation along the pontoon arm 73 to the processing plant. In this arrangement the fines and water flow back directly to the water from the dewatering trommel.

Naturally the selection of the most desirable reclaiming method and apparatus of the types illustrated depends upon the nature and properties of the particular raw material in the underwater stockpile.

It will be apparent that with the underwater stockpile and blending system in accordance with the present invention, the stockpiling is accomplished on submerged land which is far less expensive than surface land adjacent the water area without the necessity for expensive docking, unloading, and stockpile blending apparatus. It is far easier to reclaim the stockpiled minerals than to dredge the same sort of materials that have been sedimented and hardened through thousands of years. While conventional reclaiming methods and apparatus on land stored stockpiles require the complete collection of the entire stockpile, the underwater stockpiling method and apparatus in accordance with the present invention can be utilized to reclaim only the top layer or layers of stockpiled minerals while leaving the bottom mineral layers for emergency periods. Furthermore, with the present invention a minimum amount of site preparation for the storage area is required.

In the preparation of the site, if the existing area is not of the desired depth, dredging can be done. The dredged depth can be on the order of the maximum reclaiming depth to allow a certain amount of settling of the bottom with time. If the bottom settles beyond the expected amount, the material at the bottom of the stockpile can be left in place or, if necessary, mined with a vertically floating vessel.

If after some years of operation it is desired to increase the capacity, this can be easily done without encountering the complications as would be involved in a stockpile on land.

What is claimed is:

1. Apparatus for reclaiming and blending minerals in an underwater mineral stockpile comprising: a plurality of dolphins located at one side of said stockpile; a platform adapted for floatable attachment to at least a pair of said dolphins; a floatable pontoon arm; means for rotatably securing said pontoon arm at one end to said platform for swinging the other end of said pontoon arm in an arc around said platform; and dredging means mounted on said other end of said arm for reclaiming minerals from said underwater stockpile in a pattern cutting across and through said load layers effectively to blend the minerals of a number of different loads in the reclaimed mineral supply as said pontoon arm swings in an arc across the water surface above said stockpile.

2. The apparatus in accordance with claim 1 including a pipeline positioned on said pontoon arm connected to said dredging apparatus for conveying the collected minerals from said other end of said arm to said one end thereof for transport to a processing installation.

3. The apparatus in accordance with claim 1 including means positioned between said one and said other end of said arm for dewatering minerals reclaimed by said dredging means.

4. Apparatus for reclaiming and blending minerals in an underwater mineral stockpile comprising: means defining a substantially criss-crossed pattern on the sea over an underwater mineral stockpile, the lines in one direction of said pattern being substantially aligned with mineral loads dumped beneath the sea in said underwater stockpile; means for reclaiming minerals from said underwater mineral stockpile and means for moving said reclaiming means across the lines in the other direction of said pattern for reclaiming minerals from said underwater stockpile in a pattern cutting across and through said load layers effectively to blend the minerals of a number of different loads in the reclaimed mineral supply as said reclaiming means moves across said stockpile.

5. The apparatus in accordance with claim 4 wherein said moving means includes auxiliary anchors for establishing limits of movement and means for moving said reclaiming means between said anchors.

6. The apparatus in accordance with claim 4 wherein siad moving means includes a plurality of dolphins located at one side of said stockpile; a platform adapted for floatable attachment to at least a pair of said dolphins; a floatable pontoon; and means for rotatably securing said pontoon at one end to said platform for swinging the other end of said pontoon arm in an arch around said platform, said reclaiming means mounted on said other end of said arm.

7. The apparatus in accordance with claim 6 including a pipe carried by said arm for conveying reclaimed minerals from said other end of said arm to said one end thereof for transferral to a processing installation.

8. The apparatus in accordance with claim 6 including means positioned on said arm between said ends thereof for dewatering the minerals reclaimed from said underwater stockpile.

References Cited

UNITED STATES PATENTS

| | | | |
|---|---|---|---|
| 3,049,244 | 8/1962 | Hansen | 214—10 |
| 3,069,027 | 12/1962 | Dischinger | 214—10 |

OTHER REFERENCES

Power, vol. 61, No. 25, pp. 976–979, "Submerged Storage and Coal Handling Equipment at Philo."

ERNEST R. PURSER, Primary Examiner

U.S. Cl. X.R.

37—58, 69; 214—10